Oct. 7, 1958 — E. R. SAUNDERS, JR — 2,855,511
BIASED PEAKER STRIP ENERGY CONTROL SYSTEM FOR
BETATRONS AND SYNCHROTRONS
Filed Jan. 3, 1955 — 3 Sheets-Sheet 1
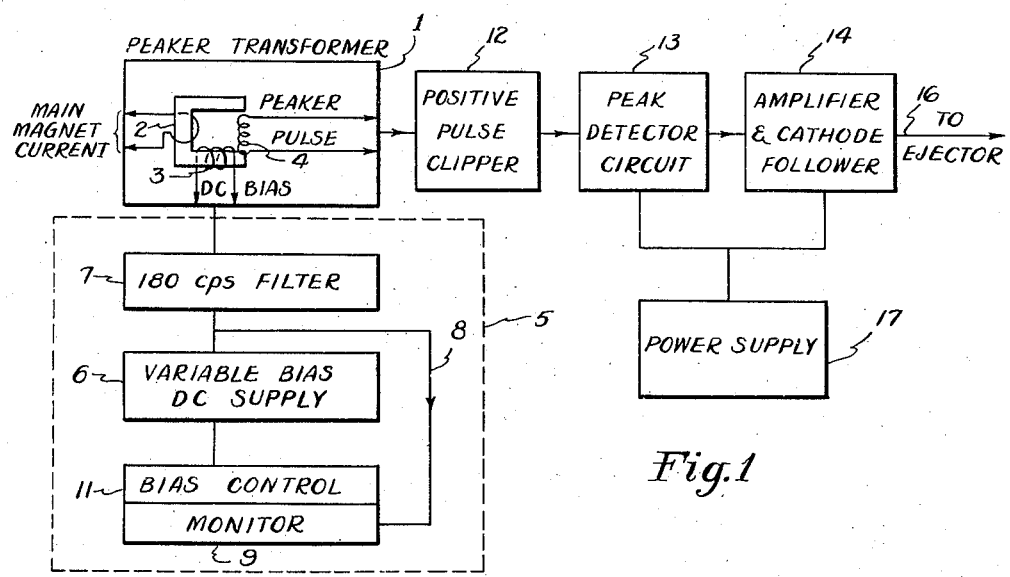
*Fig. 1*
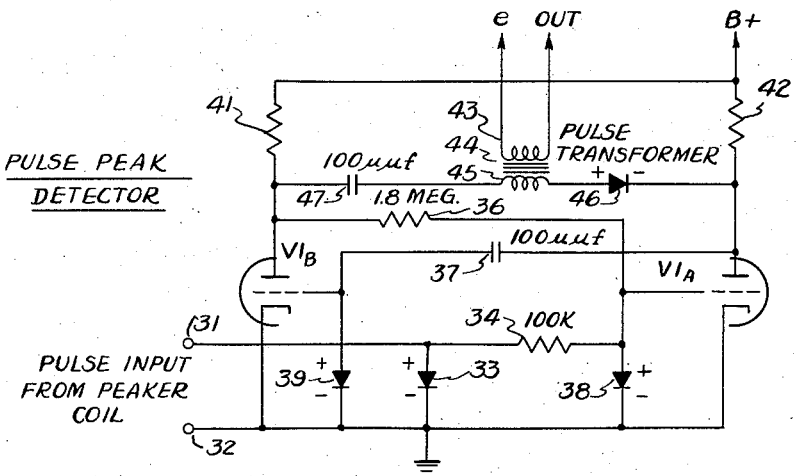
*Fig. 3*
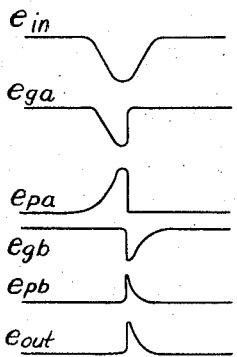
*Fig. 3-A*
INVENTOR
Edward R. Saunders, Jr.
BY Arthur Vinograd
ATTORNEY

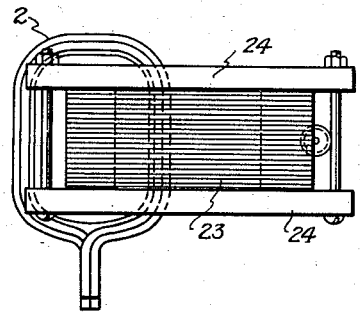
Fig. 2-C
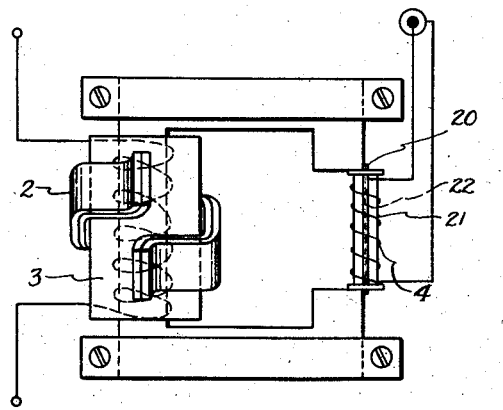
Fig. 2-A
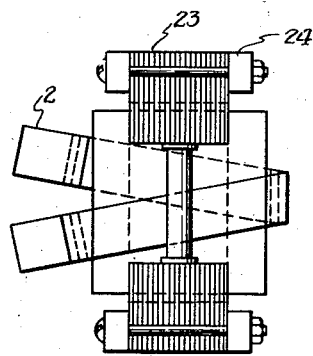
Fig. 2-B

INVENTOR
Edward R. Saunders, Jr.
BY
Arthur Vinograd
ATTORNEY

United States Patent Office 2,855,511
Patented Oct. 7, 1958

2,855,511

BIASED PEAKER STRIP ENERGY CONTROL SYSTEM FOR BETATRONS AND SYNCHROTRONS

Edward R. Saunders, Jr., Gaithersburg, Md., assignor to the United States of America as represented by the Secretary of Commerce Application January 3, 1955, Serial No. 479,690

4 Claims. (Cl. 250—27)

This invention relates to energy control systems and more particularly to a biased peaker strip energy control system for use in connection with high energy particle accelerators such as betatrons and synchrotrons.

The present energy control system was developed to pre-set and maintain the X-ray energy level of the 50 m. e. v. field biased betatron at the National Bureau of Standards. It has been found to function quite successfully. The system operates on the principle of a D. C. field biased peaker transformer which monitors the current in the main magnetizing coil of the betatron and generates a pulse when the pre-set D. C. magnetic flux of the transformer corresponding to a specific energy, is overcome. The generated pulse triggers the ejection circuit of the betatron.

One object of this invention is to provide an improved energy control system for betatrons and synchrotrons.

Another object of this invention is to provide a novel peaker transformer for field biased betatrons and synchrotrons.

A further object of this invention is to provide a novel peak detector circuit for field biased betatrons and synchrotrons.

A final object of this invention is to provide a novel ejection timing circuit for field biased betatrons and synchrotrons.

A more complete understanding of the present invention will be had with reference to the drawings in which:

Fig. 1 is a block diagram of the energy control system of the present invention;

Figs. 2A–2C show front, side, and top views respectively of the novel peaker transformer incorporated in the energy control system of the present invention;

Fig. 3 is a circuit diagram of the novel peak detector utilized in the energy control system of the present invention;

Fig. 3A shows voltage waveforms at various points in the circuit of Fig. 3;

Figure 4:
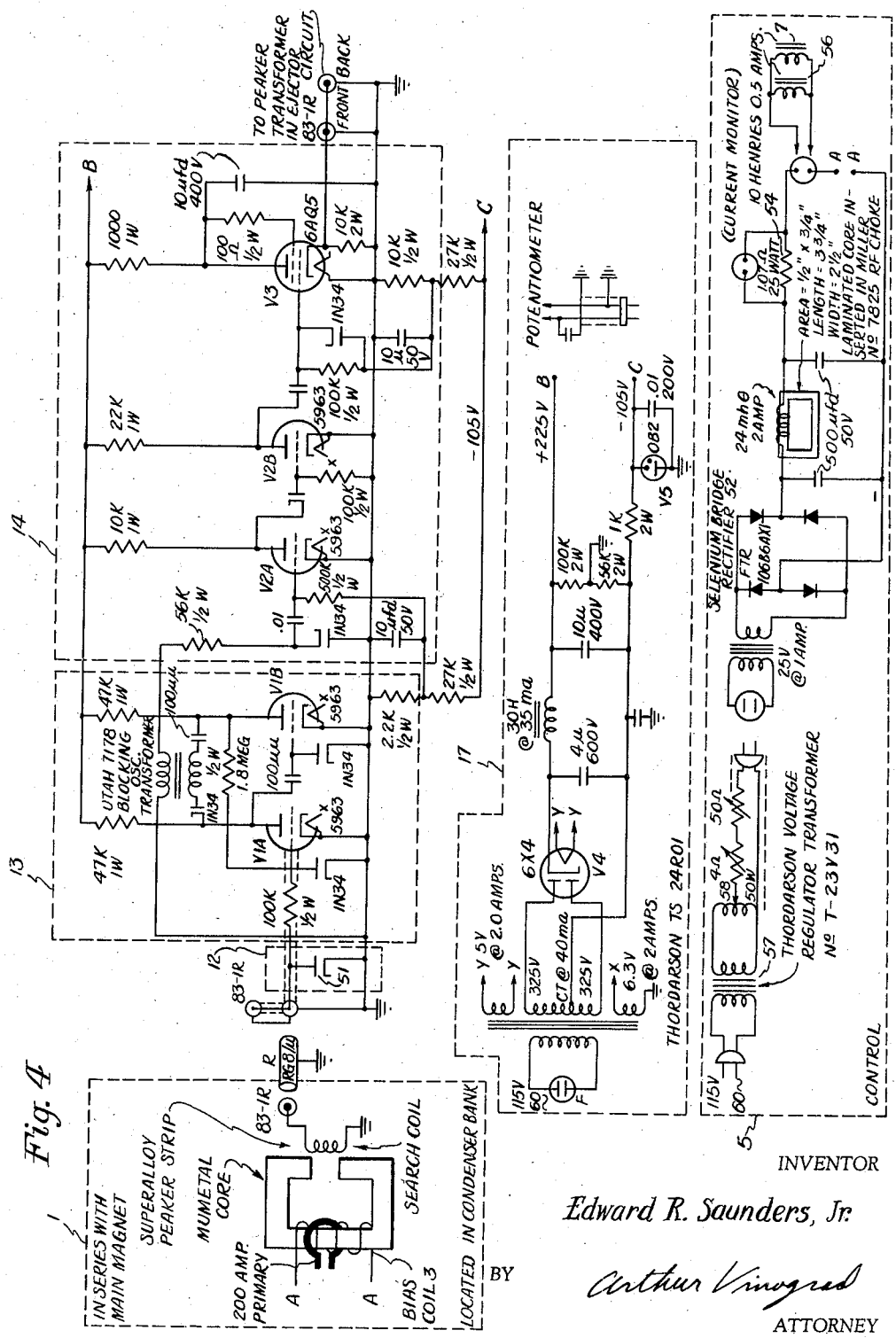
Fig. 4 shows the complete circuit diagram of the energy control system of the present invention.

In the use of betatrons and synchrotrons it is desirable to have an accurate and reliable means for ejecting the accelerated particles when they have reached a predetermined energy level. Since the particle speeds involved are so great the signal to the ejection circuit must be timed correctly to within a few microseconds.

The present invention provides an energy control system based on the cancellation of opposing flux in a peaker transformer and the subsequent detection of this flux cancellation is used to provide a signal to an ejection circuit at the time the particles being accelerated have reached the desired energy level. The flux cancellation is controlled by adjusting a D. C. bias flux to a value corresponding to the predetermined desired energy level.

In Fig. 1 is shown a block diagram of the overall energy control system of the present invention. The main magnet current of a field biased betatron or synchrotron is fed to a peaker transformer shown generally at 1 through a single turn coil 2. A D. C. bias control voltage is applied to bias or bucking winding 3, while the pulse output of peaker transformer 1 appears across output coil 4. The bias voltage for coil 3 is derived from a variable bias D. C. supply 6 through a low pass $\pi$ section filter 7.

Lead 8 provides means for feeding the bias voltage from the input to winding 3 to a voltage monitor 9 which in turn may be coupled to a bias control circuit 11. As a result any undesired variation in bias voltage at winding 3 is detected by monitor 9 actuating bias control circuit 11 which in turn functions to vary the output of variable bias supply 6 in a direction so as to counteract the undesired voltage change at winding 3.

The pulse output across winding 4 is passed through a positive pulse clipper 12 to a peak locating or peak detector circuit 13. The output of peak detector 13 is supplied to an amplifier and cathode follower circuit 14 and thence to the ejector circuit (not shown) of a betatron or synchrotron by way of lead 16. Power supply 17 provides power for peak detector 13 and the amplifier and cathode follower circuit 14.

The system operates in the following manner: A magnet flux is produced in the core of peaker transformer 1 by passing the main magnetizing current of the betatron or synchrotron through the single turn primary winding 2. The flux caused by this current is proportional to the field in the air gap of the betatron or synchrotron since the air gap constitutes practically the entire reluctance presented to the magnetic field of such a device.

A direct current is passed through bias coil 3 by way of low pass filter 7 from D. C. supply 6 in such a direction as to produce a magnetic flux that bucks the flux produced by the main magnetizing current through coil 2. Thus by adjusting the variable D. C. supply 6 the direct current through bias coil 3 can be controlled to cause cancellation of the primary flux by the bias flux at any value of primary flux desired. This flux cancellation is detected and appears as an output pulse across peaker coil 4.

Figs. 2A–2C show in detail, elevation, side and top views respectively of the peaker transformer 1. The primary winding 2 comprises one turn of a $\frac{1}{8}''$ x $\frac{3}{4}''$ copper strap doubled and lugged for No. 00 wire. Bias coil 3 is formed of 400 turns of No. 20 varnished wire, layer insulated by glass tape. Peaker coil 4 consists of 5000 turns of No. 40 formex wire wound around a methyl methacrylate coil form 21. Within peaker coil 4 extends a supermalloy peaker strip 22, $0.0007'' \times \frac{1}{16}'' \times 2\frac{1}{16}''$, mounted in a rigid protecting tube 20, both tube and strip being heat treated and left untouched after treatment. The transformer core 23 is composed of mumetal transformer laminations carefully sheared to shape, 100 percent interleaved, and with both sides of each lamination coated with an acrylic spray coating material. The laminated core 23 is bound by four bakelite strips 24 $\frac{3}{8}'' \times \frac{5}{8}'' \times 5''$ in size.

The primary winding 2 is designed to carry the main magnetizing current of 225 amperes with a large safety factor. Winding 2 is closely superimposed on bias coil 3 so that it will enclose as much of the flux generated by coil 3 as possible. Bias coil 3 is designed so that it encloses all the flux generated by primary winding 2 and is large enough so as not to exhibit any appreciable heating.

The peaker strip assembly consists of the high permeability magnetic strip 22 that saturates at low values of magnetic field, and the peaker coil 4 wound around the strip 22. Since strip 22 saturates in a very small field, its permeability is essentially unity in magnetic fields that are not near zero and is very high when the field is near zero. Therefore, in a varying magnetic field, a voltage pulse appears across coil 4 when the field passes through zero.

The narrower the voltage pulse the more accurately can the zero flux point be located. In order to obtain a large and sharp peaker pulse, the following peaker strip material characteristics are desirable.

(1) The $$\frac{dB}{dH}$$

ratio should be extremely large in the unsaturated portion of the B—H curve.

(2) The B—H hysteresis loop should enclose the smallest possible area.

(3) Saturation should occur at a small value of B.

(4) The B—H hysteresis loop should have sharp "knees."

The material selected for the peaker strip is supermalloy having a working permeability at 180 C. P. S. of approximately 400,000, a coercive force 0.04 oersted and a saturation point at about 6800 gauss. The nomenclature for this particular melt is molypermanol which consists of 4.5 percent molybdenum, 15.6 percent iron, 0.5 percent manganese deoxidizing agent, 78.8 percent nickel and the remainder impurities.

A 1/16" by 2 1/16" strip was cut from a 0.00072" supermalloy ribbon and was placed in the Alundum tube 20. After the strip was cut and placed in the tube 20, it was reheat-treated to increase the desired magnetic properties. The strip itself was left in the alundum tube after this final heat treatment.

The peaker coil is wound on the coil form 21 which may be made of methyl methacrylate, Plexiglas or polystyrene, thus allowing very good coupling with the peaker strip 22. Since the voltage generated in the coil 4 is proportional to its number of turns, it is advantageous to wind as many turns as possible and therefore minimize the required pulse amplification. The maximum number of turns is limited by loss in coupling and by an increase in voltage pulse width. In this specific case 5000 turns of No. 40 enameled copper wire were found to be optimum. A 30-volt, 20 microsecond (at half amplitude) pulse is generated in the peaker coil, when the transformer is excited with no D. C. bias applied to coil 3 and with the single turn primary energized with the main magnet current. (A. C.+D. C. operation.) As the bucking flux is increased the energy to be controlled is likewise increased, which means that the $dH/dt$ of the main flux to be cancelled decreases in value, approaching zero at the maximum machine energy. This causes an increase in peaker pulse width and a decrease in peaker pulse amplitude with increase in energy.

Fig. 3 shows the pulse peak locating or detector circuit 13 employed in the schematic of Fig. 1 while Fig. 3A illustrates voltage waveforms at various points in the detector circuit 13.

The input from pulse peaker coil 4 is fed to one half $V_{1A}$ of twin triode $V_{1A}$, $V_{1B}$ by way of input leads 31 and 32. A crystal diode 33 is connected across the input and a 100K resistor 34 is placed in series with the input applied to leads 31, 32. The plate of $V_{1B}$ is coupled to the grid of $V_{1A}$ through a 1.8 meg. resistor 36 and the plate of $V_{1A}$ is coupled to the grid of $V_{1B}$ through 100 $\mu\mu f$. capacitor 37. The grids of $V_{1A}$ and $V_{1B}$ are connected to ground via crystal diodes 38 and 39 respectively. Plate voltage is supplied to the triode halves $V_{1A}$ and $V_{1B}$ through 47K resistors 41 and 42. An output signal is taken from the secondary 43 of pulse transformer 44, the primary winding 45 of which is connected to the plate of $V_{1A}$ by way of crystal diode 46 and to the plate of $V_{1B}$ by way of 100 $\mu\mu f$. capacitor 47.

In Fig. 3A $e_{in}$ represents the voltage input from pulse peaker coil 4 across leads 31 and 32. The second waveform $e_{ga}$ shows the input to the grid of triode half $V_{1A}$. The third waveform $e_{pa}$ shows the voltage at the plate of $V_{1A}$ while the fourth and fifth waveforms $e_{gb}$ and $e_{pb}$ represent the voltages at the grid and plate respectively of triode half $V_{1B}$. The ouput across secondary winding 43 of pulse transformer 44 is shown as the sixth waveform labeled $e_{out}$.

The operation of the circuit of Fig. 3 is as follows: $V_{1A}$ and $V_{1B}$ are normally conducting. The negative pulse ($e_{in}$ Fig. 3A) from the peaker coil is fed to the grid of $V_{1A}$. The grid follows the impressed signal as shown by $e_{ga}$ and the plate voltage of $V_{1A}$ increases as in $e_{pa}$. The grid of $V_{1B}$ although condenser coupled to the plate of $V_{1A}$ is maintained at a consatnt potential during the rise of $e_{pa}$ by the 1N34A crystal diode 39 in the grid circuit, thus causing the capacitor 37 to charge. The plate voltage of $V_{1B}$ ($e_{pb}$) remains constant during this charging time since the grid is clamped by the diode 39, maintaining grid voltage, $e_{gb}$, constant. So long as $e_{pa}$ increases in the positive direction, the change in current through the pulse transformer and the 1N34A diode 46 in the plate circuit remains zero due to the high back resistance of this diode. Thus no pulse is generated in the transformer during the negative going portion of the input pulse. However, when the polarity of the slope of the input signal changes, the gride of $V_{1A}$ starts in a positive direction and $e_{pa}$ starts in a negative direction. The grid of $V_{1B}$ is driven negative and therefore unclamped by the diode 39, allowing the grid to go as far negative as the drop in $e_{pa}$. The plate voltage of $V_{1B}$ ($e_{bp}$) immediately arises. There is an in-phase feedback voltage from the plate of $V_{1B}$ through the 1.8 megohm resistor 36 to the grid of $V_{1A}$ which gives a sharp rise to the difference voltage between $e_{pa}$ and $e_{pb}$. This difference voltage is in such a direction as to make the diode 46 in the plate circuit conduct, so that a high current pulse with a fast rise flows through the pulse transformer 44. The pulse generated in the output winding 43 is approximately 5 volts in amplitude and one microsecond in duration.

The complete circuit for the energy control system of the present invention is shown in Fig. 4. The peaker transformer 1 is shown separated from the remainder of the circuit by dashed lines as are the other elements corresponding to the various blocks of Fig. 1. A direct current potential is supplied to bias coil 3 across leads AA. The signal output goes from peaker transformer 1 through positive pulse clipper 12 which is in the form of a conventional damping circuit employing a crystal rectifier 51. The output from the clipper is applied to the peak detector circuit 13. The output of peak detector circuit 13 is fed in turn to the amplifier and cathode follower circuit 14. The latter comprises a conventional A. C. amplifier consisting of tubes $V_{2A}$ and $V_{2B}$, and a cathode follower $V_3$. The signal from the cathode follower consists of a positive 50-volt, 1 microsecond pulse.

The power supply 17 (Fig. 1) is conventional and is completely detailed in Fig. 4. No further explanation is therefore considered necessary.

The peaker transformer bias supply unit 5 of Fig. 1 is designed to furnish a regulated variable direct current to generate the required bias flux. The supply consists of a regulated variable A. C. power input to a selenium bridge rectifier 52 which is followed by the low pass filter 7.

The characteristics required of unit 5 are: (1) Low power source ripple, (2) low induced pick-up, (3) high impedance to 180 C. P. S. and low to D. C., (4) no rapid fluctuations in bias current, (5) good drift stability. The ripple current as measured through the 1.07 ohm monitoring resistor 54 is less than 0.001 ampere. In order to keep the induced pick-up in the wiring to a minimum, it is necessary to use shielded cable throughout the bias system. The choke 56 shown in series with the bias coil 3 (by way of connection AA) and which form filter section 7 are included to reduce to an acceptable value the alternating current caused by the induced 180 C. P. S. voltage in the bias coil. The A. C.

pick-up plus induced current is found to be 0.011 ampere. Since the load is constant, any rapid fluctuation in bias current is due to a fluctuation in the A. C. power from the line. In order to minimize such fluctuations and to minimize the drift, the input voltage is regulated with a constant voltage transformer 57. In addition all circuit components and wiring are over designed powerwise, thus allowing a minimum of drift due to a temperature change caused by internal heating. The bias circuit as shown, is variable from zero to 0.7 ampere and is monitored continuously with a potentiometer 58 with an accuracy of 0.1 percent.

The energy control system was calibrated in the energy range below 20 m. e. v. by observing the thresholds of four photo-nuclear reactions and one photo-fission reaction which were accurately known and ranged from $1.63 \pm 0.03$ m. e. v. to $18.7 \pm 0.1$ m. e. v. The $Be^9$, $Cu^{63}$, $O^{16}$, $C^{12}$, and $U^{238}$ thresholds were selected because of the convenient half-lives of the induced activities, the energy at which the threshold occurs, and the sharpness of definition of the threshold. Table I gives reactions, activities and thresholds of the elements observed, and the corresponding peaker transformer bias.

*Table I*

| Reaction | Activity | Accepted Threshold (m. e. v.) | Peaker-Trans Bias (volts) |
|---|---|---|---|
| $Be^9(\gamma,n)Be^8$ | Neutrons | $1.63 \pm 0.03$ | $0.015 \pm 0.002$ |
| $U^{238}(\gamma,f)$ | | $5.08 \pm 0.15^5$ | $0.075 \pm 0.002$ |
| $Cu^{63}(\gamma,n)Cu^{62}$ | 10 min | $+10.61 \pm 0.05^6$ | |
| | | $10.9 \pm 0.2^7$ | $0.172 \pm 0.001$ |
| $O^{16}(\gamma,n)O^{15}$ | 118 Sec | $+15.6^8$ | $0.263 \pm 0.001$ |
| $C^{12}(\gamma,n)C^{11}$ | 20.5 min | $+18.7 \pm 0.1$ | $0.310 \pm 0.005$ |

It will be apparent that the embodiments shown are only exemplary and that various modifications can be made in construction and arrangement within the scope of invention as defined in the appended claims.

What is claimed is:

1. A peak detector circuit comprising a first electron discharge device, means for applying an input signal to the control grid of said first device, a second electron discharge device, a resistor coupled from the control grid of said first device to the plate of said second device, a capacitor coupled from the plate of said first device to the control grid of said second device, a capacitor and rectifier in series with the primary winding of a pulse transformer coupled between said plates, said pulse transformer having a secondary winding for utilizing an output signal from said detector circuit.

2. A peak detector circuit comprising a first electron discharge device, means for applying an input signal to the control grid of said first device, a second electron discharge device, a resistor connected from the control grid of said first device to the plate of said second device, a capacitor connected from the plate of said first device to the control grid of said second device, a capacitor and rectifier in series with the primary winding of a pulse transformer connected between said plates, said rectifier poled to conduct current from the plate of said second device to the plate of said first device, a rectifier connected between the grid of each said discharge device and ground, said pulse transformer having a secondary winding for utilizing an output signal from said detector circuit.

3. A pulse peak detector comprising a first electron discharge device having signal input and output electrodes, means for applying an input signal pulse to said first device, a second electron discharge device having signal input and output electrodes, a first impedance coupled from the input electrode of said first device to the output electrode of said second device, a second impedance coupled from the input of said second device to the output of said first device, a third impedance and rectifier means in series with the primary winding of a pulse transformer coupled between the output electrodes of said devices, said pulse transformer having output means for deriving a signal from said primary winding.

4. A peak detector as defined in claim 3 in which said first impedance is resistive and said second and third impedances are capacitive.

References Cited in the file of this patent

UNITED STATES PATENTS

| | | |
|---|---|---|
| 2,058,302 | Faus et al. | Oct. 20, 1936 |
| 2,292,514 | Galick | Aug. 11, 1942 |
| 2,413,932 | Sziklai | Jan. 7, 1947 |
| 2,465,185 | Anderson | Mar. 22, 1949 |
| 2,502,687 | Weiner | Apr. 4, 1950 |
| 2,509,742 | Myall | May 30, 1950 |
| 2,622,194 | Lawson et al. | Dec. 16, 1952 |
| 2,624,841 | McMillan | Jan. 6, 1953 |
| 2,655,597 | Scoles | Oct. 13, 1953 |